United States Patent
Demoulin et al.

(10) Patent No.: US 9,359,954 B2
(45) Date of Patent: Jun. 7, 2016

(54) IN-LINE REMOVABLE HEAT SHIELD FOR A TURBOMACHINE SUSPENSION YOKE

(71) Applicant: SNECMA, Paris (FR)

(72) Inventors: Lambert Olivier Marie Demoulin, Paris (FR); Julien Pavillet, Epinay sous Senart (FR); Guilhem Seize, Cachan (FR)

(73) Assignee: SNECMA, Paris (FR)

( * ) Notice: Subject to any disclaimer, the term of this patent is extended or adjusted under 35 U.S.C. 154(b) by 333 days.

(21) Appl. No.: 14/053,862

(22) Filed: Oct. 15, 2013

(65) Prior Publication Data

US 2014/0102114 A1    Apr. 17, 2014

(30) Foreign Application Priority Data

Oct. 15, 2012 (FR) ................................... 12 59833

(51) Int. Cl.
*F02C 7/24* (2006.01)
*F02C 7/20* (2006.01)
*B64D 27/26* (2006.01)

(52) U.S. Cl.
CPC . *F02C 7/20* (2013.01); *B64D 27/26* (2013.01); *F02C 7/24* (2013.01); *B64D 2027/266* (2013.01)

(58) Field of Classification Search
CPC ............... F02C 7/20; F02C 7/24; F02C 7/25; F05D 2240/15; F05D 2240/90; F05D 2240/91; F01D 25/28; F01D 25/243; B64D 27/26; B64D 2027/262; B64D 2027/264; B64D 2027/266; B64D 29/06
See application file for complete search history.

(56) References Cited

U.S. PATENT DOCUMENTS

| | | | | |
|---|---|---|---|---|
| 4,943,013 A * | 7/1990 | Kapala | .................... | B64D 27/26 244/54 |
| 5,474,258 A * | 12/1995 | Taylor | .................... | B64D 27/26 244/54 |
| 5,910,094 A | 6/1999 | Kraft et al. | | |
| 2009/0266933 A1* | 10/2009 | Foster | .................... | B64D 27/26 244/54 |
| 2012/0018575 A1* | 1/2012 | Whiteford | .............. | B64D 27/20 244/54 |

FOREIGN PATENT DOCUMENTS

| | | |
|---|---|---|
| EP | 0 357 504 A1 | 3/1990 |
| EP | 1 284 390 A1 | 2/2003 |
| EP | 2 549 188 A2 | 1/2013 |
| FR | 2 983 172 A1 | 5/2013 |

OTHER PUBLICATIONS

United Kingdom Search Report issued May 16, 2014 in Patent Application No. 1318247.2.
French Preliminary Search report Issued on Jul. 3, 2013 in French 12 59833, filed on Oct. 15, 2012 ( with English Translation of category of Cited Documents).

* cited by examiner

*Primary Examiner* — Andrew Nguyen
(74) *Attorney, Agent, or Firm* — Oblon, McClelland, Maier & Neustadt, L.L.P

(57) ABSTRACT

A heat shield device for a yoke suspending an engine from an aircraft is provided. The device includes panels able to be fixed to the yoke, at least one of the panels extending radially in the direction of the axis of the engine, and a component configured to be fixed to the engine and including a groove shaped in such a way that the lower end of the panel can be inserted into it.

14 Claims, 4 Drawing Sheets

IN-LINE REMOVABLE HEAT SHIELD FOR A TURBOMACHINE SUSPENSION YOKE

BACKGROUND OF THE INVENTION

1. Field of the Invention

The field of the present invention is that of turbomachines and, more particularly, that of the devices for attaching the turbomachines to the aircraft that they propel.

2. Description of the Related Art

An engine, such as a turbojet or turboprop engine may be mounted at various points on the aeroplane, by attachment to a pylon or strut belonging to the aeroplane structure. It may thus be suspended under the wing structure, fixed to the fuselage or mounted in the tail assembly using appropriate means of attachment. These attachment means have the function of transmitting mechanical load between the engine and the structure of the aeroplane. The loads to be taken into consideration are notably the weight of the engine, its thrust, and any lateral aerodynamic loadings. The loads to be transmitted also comprise, amongst other things, the need to react the rotational torque about the axis of the engine.

One method of suspension is to attach the engine to a strut belonging to the structure of the wing of the aeroplane using a forward suspension device and a rear suspension device. The forward suspension, for example in the case of a turbofan engine, is then fixed to the intermediate casing downstream of the fan casing and the rear suspension to the primary flow exhaust casing. These two components in fact constitute the structural elements of a turbomachine, by which all forces are absorbed.

Modern turbojet engines are double flow turbomachines with a high bypass ratio, the secondary or bypass air stream being compressed by a single compressor stage known as the fan. On leaving this stage it is guided by a duct directly into a nozzle to contribute to the thrust of the engine. It thus flows between the main spool of the engine, delimited by casings, and a cold stream duct (generally denoted by its English-language acronym OFD which stands for Outer Fan Duct). This duct is fixed to the engine by connections situated at its two longitudinal ends, a first fixing being upstream on the intermediate casing and a second at the rear on a support ring borne by the exhaust casing.

At its external radius, the intermediate casing generally has two flanges to which the fan casing is fixed at the upstream end and the outer fan duct is fixed at the downstream end. Positioned between these two flanges are localized reinforcements on which a yoke is mounted, forming a means of suspending the engine, and providing the connection with the aircraft and allowing the transfer of the abovementioned loadings. This yoke, as depicted in FIG. 1, is truly yoke-shaped with a rigid central structural part and two pads mounted with the freedom to rotate at the ends of this structural part so as to allow any deformation or movement of the engine in use on the aircraft. It is generally protected from the external elements by a heat shield which envelops it and which provides a barrier against the spread of any engine fire towards the aircraft.

In the conventional way, this heat shield is formed of several elements, in the form of panels, which are assembled with one another and fixed to the suspension yoke. Bearing in mind the way the flanges of the intermediate casing and of the outer fan duct evolve during use, these flanges can sometimes impact on one of the elements that forms the heat shield of the yoke, and this is prejudicial to its life. Moreover, removing the heat shield is a relatively complex task and cannot always be performed with the engine installed on the aeroplane, and this means that the engine has to be taken off in order to perform maintenance on this heat shield.

It is an object of the present invention to alleviate these disadvantages by proposing a heat shield device for an engine suspension means that is easy to remove and allows the requisite movements of the flanges of the intermediate casing and of the outer fan duct without the risk of damaging the heat shield associated with this means, or of reducing the fire protection afforded.

BRIEF SUMMARY OF THE INVENTION

To this end, one subject of the invention is a heat shield device for a means of suspending an engine from an aircraft, the said device comprising panels able to be fixed to the said means, at least one of the said panels extending radially in the direction of the axis of the engine, characterized in that it further comprises a component configured to be fixed to the said engine and comprising a groove shaped in such a way that the lower end of the said panel can be inserted into it.

The groove forms a barrier which acts as an effective seal against the spread of any fire that might break out. There is no longer any need to protect the yoke with a shield at its base, and this means that the heat shield can be removed without the need to remove the engine from the aircraft.

Advantageously, the said groove is formed by a bottom and at least two extensions extending in parallel and spaced-apart directions so that the said lower end of the said panel can be inserted into it.

This then yields a double chicane configuration which improves the barrier effect against the spread of fire.

For preference, the said panel comprises at least two ribs extending in the direction of the axis of the engine, the said ribs being spaced apart so that one of the extensions of the said component can be inserted between them when the said lower end of the said panel is inserted into the groove of the said component. This then yields even better protection against the spread of fire, because of the triple-labyrinth barrier configuration.

Advantageously, the said groove has a width greater than that of the said panel so as to allow it to move laterally within the said groove. In this way damage to the heat shield caused by relative movements during use of the flanges of the intermediate casing and of the panels that make up the heat shield is avoided. Likewise, the bottom of the said groove has enough of a clearance to the said panel that it can move radially while at the same time affording thermal insulation via the labyrinths it constitutes with the said extensions.

In one particular embodiment, the space in-between the two ribs of the said panel has a width greater than that of the extension of the said component, so as to allow the said panel to move laterally with respect to the said component.

For preference, the device is shaped to surround the said means of attachment by four parallel walls extending radially so as to adapt to the shape of a turbomachine casing, and the said component is formed of two cylindrical elements equipped with means of attachment to a turbomachine casing flange and of two rectilinear elements equipped with fixing means for fixing to the said cylindrical elements.

Advantageously, the said fixing means are of the tenon type fitting into mortices made in the said cylindrical elements.

In a preferred embodiment, the cylindrical elements have the shape of a numeral 4 with parallel branches, the panels of which the lower end is inserted into the said cylindrical elements comprising two ribs one of which is inserted between the said parallel branches.

In another preferred embodiment, the rectilinear elements have the shape of a U, the panels of which the lower end is inserted in the said rectilinear elements being inserted between the branches of the said U.

The invention also relates to a turbomachine comprising a means of attachment to an aircraft, which is positioned on its intermediate casing and/or on its exhaust casing, characterized in that it comprises a heat shield device as described herein above for the said means of attachment.

BRIEF DESCRIPTION OF THE SEVERAL VIEWS OF THE DRAWINGS

The invention will be better understood, and other objects, details, features and advantages thereof will become more clearly apparent during the course of the explanatory detailed description which will follow, of one embodiment of the invention given by way of purely illustrative and nonlimiting example with reference to the attached schematic drawings.

In these drawings.

DETAILED DESCRIPTION OF THE INVENTION

Figure 1:
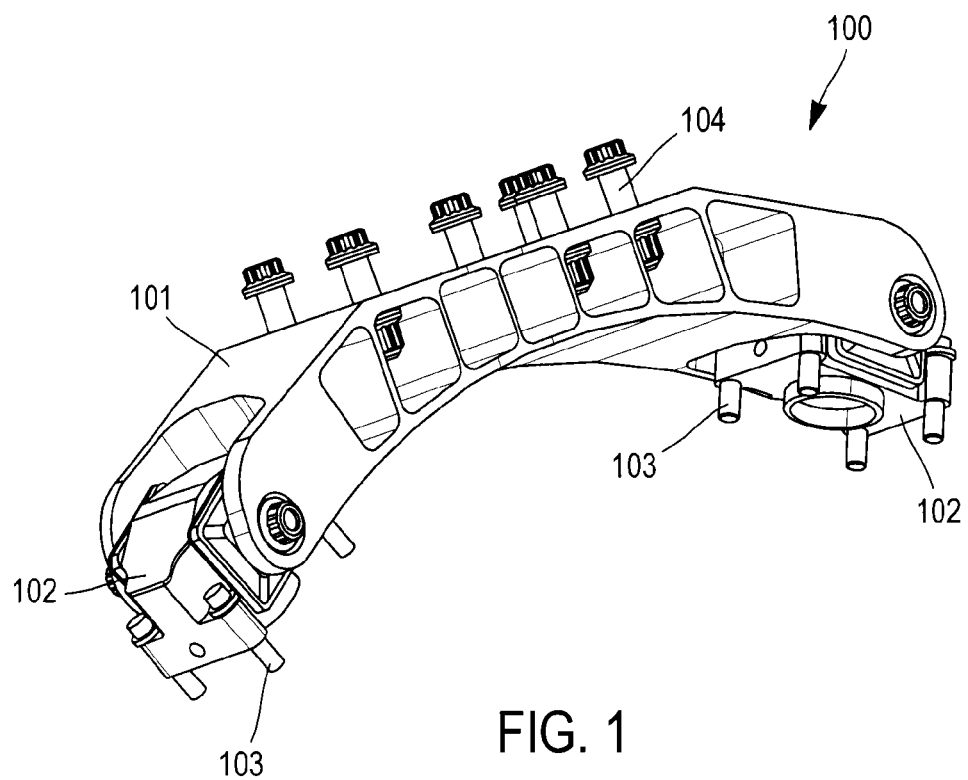
FIG. 1 is a perspective view of an aircraft engine suspension yoke.

Reference is made to FIG. 1 which shows a yoke 100 for suspending an aircraft engine and for fixing this engine to the structure of the aircraft. It is in the shape of a yoke comprising a substantially cylindrical structural component 101 with a curvature similar to that of the engine it is to carry, comprising at its two circumferential ends pads 102 for fixing to the engine. These pads have the ability to rotate about an axis parallel to the axis of the engine, allowing for easy mounting of the yoke 100 on the engine by orientating the pads to face attachment means provided for that purpose on the intermediate casing of the engine. The pads 102 comprise fixing means 103 of the screw type which are configured to collaborate with tapped bores forming means of attachment of the intermediate casing. At its upper part, the structural component 101 further comprises bores through which there pass bolts 104 that fix the yoke to the structure of the aircraft.

Figure 2:
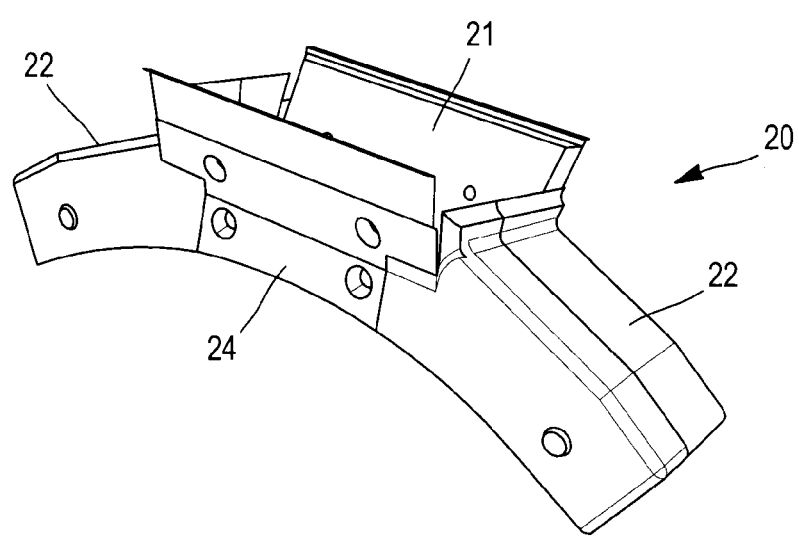
FIG. 2 is a perspective view of a heat shield module for the yoke of FIG. 1.

FIG. 2 shows a heat shield device 20 for the suspension yoke of FIG. 1. It is made up in the conventional way of a collection of panels, contiguous with one another so that they envelop the yoke and prevent the passage of any flames coming from the engine, which flames could damage it if the engine were the site of an accidental fire. In the prior art, this heat shield device used to comprise, in addition to the panels surrounding the yoke, a panel (not visible in the figure) positioned underneath it, slipped in between the yoke and the outer cylindrical shell ring of the intermediate casing. This panel, on the one hand, is very difficult to access thus excluding maintenance operations on this heat shield device without the engine being removed from the aircraft. One of the objectives pursued by the invention is thus to eliminate this particular panel, while at the same time maintaining effective protection against the spread of fire towards the yoke 100.

The overall heat shield surrounds the suspension yoke 100, with a central part 21 open upwards to let through the elements that join the yoke to the structure of the aircraft, and two closed lateral parts 22 which cover the ends of the yoke bearing the pads 102. Each of these parts comprises lateral walls 24 which are aligned with one another and orientated transversally with respect to the axis of rotation of the engine to form an axial barrier to the spread of any potential fire. They also comprise radial parts aligned along the axis of the engine which enclose the heat shield and provide a circumferential barrier.

Figure 3:
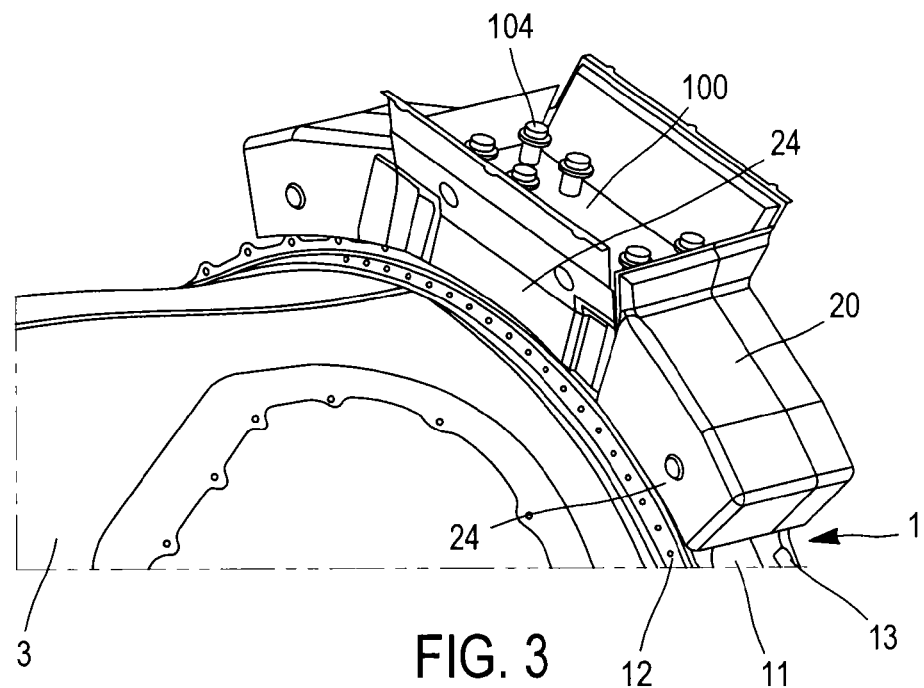
FIG. 3 is a perspective view of the heat shield of FIG. 2, in place on the engine.

FIG. 3 shows the heat shield device of FIG. 2 in place around an engine suspension yoke 100. The heat shield is positioned on top of the outer shell ring 11 of the intermediate casing 1, which extends axially between two flanges, a downstream flange 12 to which the outer fan duct 3 is attached and an upstream flange 13 to which the fan casing, not depicted, is fixed. In the configuration shown, which illustrates the prior art, the lateral walls 24 extend downwards, towards the axis of the engine, until they cover the outer part of the flanges 12 and 13 of the intermediate casing and thus form with them an axial fire break labyrinth. A labyrinth is characterized by a heat shield lateral wall which extends down radially below the largest radius of the flange that it protects. In order to afford the best possible protection against the risk of spread of fire towards the yoke 100, the clearance left between the lateral wall 24 and the corresponding flange 12 or 13 is reduced to a minimum. Because of this, problems of interference between the flanges and the lateral walls of the heat shield have been encountered during use, causing damage to the said lateral walls.

Figure 4:
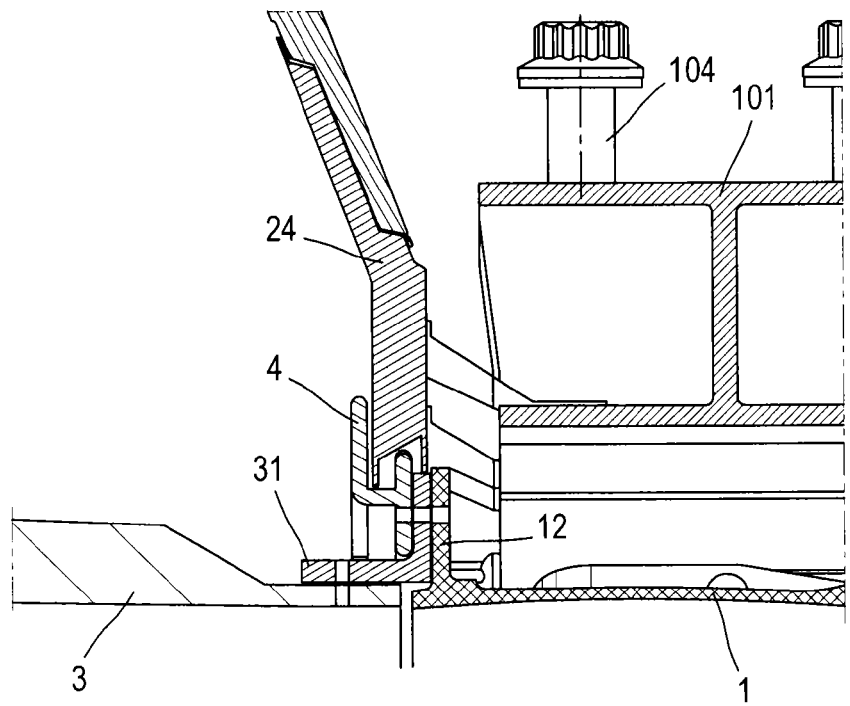
FIG. 4 is a view in cross section of a heat shield device according to one embodiment of the invention, in position on the engine.

FIG. 4 is a cross section of an embodiment of a device, according to the invention, for connecting the heat shield with the intermediate casing of an engine. A similar device can also be fitted in the vicinity of the heat shield of the rear suspension means, mounted for example on the exhaust casing. The figure shows an intermediate casing 1 connected by its downstream flange 12 to an outer fan duct 3 that has a connecting flange 31 which is in this instance attached to its upstream end. The two flanges circumferentially have a series of drillings through which fasteners of the bolts type pass in the conventional way in order to join the two components together. Also fixed to these two flanges is a cylindrical component that forms a lateral heat shield 4 and barrier against fire. This component, which will be described in greater detail with reference to FIG. 5, extends along the circumference of the intermediate casing over the entire length of the lateral wall 24 of the heat shield 20 of the suspension yoke 100 and has, in axial section, a section in the shape of a numeral 4 with parallel branches. Above this lateral heat shield 4 can be seen the lateral wall 24 which is inserted into the space left between the branches of the numeral 4, so as to form a labyrinth to hold back any fire there might be. The lateral wall 24 ends in two radial ribs, extending in the continuation of its two faces, and leaving between them a space that will be occupied by one of the branches of the lateral heat shield 4.

Figure 5:
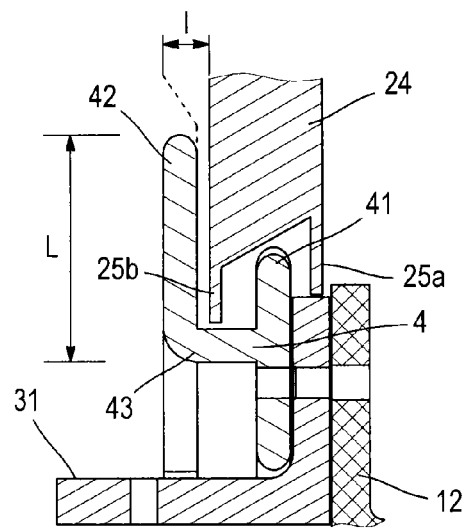
FIG. 5 is a detailed view of the device of FIG. 4.

Reference is now made to FIG. 5 which shows the lateral heat shield 4 which has two parallel branches, an inner branch 41 which espouses the shape of the flanges 12 of the intermediate casing 1 and 31 of the outer fan duct 3 and against which it bears, and an outer branch 42 which extends radially, parallel to the inner branch leaving between them an axial space that forms a housing for one of the radial ribs of the lateral wall 24. These two, outer and inner, branches are connected to one another by a cylindrical axial branch 43 the length of which defines the spacing between the two first branches. The inner branch 41 is pierced with bores, evenly distributed about its circumference, which fall facing bores made in the downstream flange 12 of the intermediate casing and of the attached flange 31 of the outer fan duct; in that way, the lateral heat shield 4 can be fixed to the intermediate casing using the same fixing means as those used for assembling the outer fan duct with the downstream flange 12 of the intermediate casing 1.

The lateral wall 24 comprises two radial ribs, an upstream rib 25*a* and a downstream rib 25*b* which extend the lateral faces of the said wall. The axial separation there is between these two ribs is substantially the same as the separation there is between the inner 41 and outer 42 branches of the lateral heat shield 4. In that way, this lateral wall 24 can move in relation to the lateral heat shield 4 without one of the ribs striking the corresponding branch of the lateral heat shield before the other does the same with its corresponding branch. On assembly, a clearance "l" is left between the outer branch 42 and the downstream rib 25*b* of the lateral wall 24 and that same clearance "l" is found again between the upstream rib 25*a* of the said lateral wall and the inner branch 41.

The system of the ribs of the lateral wall 24 and of the inner and outer branches which are radially imbricated with one another forms a triple labyrinth which, by imposing three changes in direction on a flame seeking to cross the heat shield, affords effective protection against the spread of any fire there might be. Their axial spacing also, in use, allows the lateral wall 24 to move relative to the lateral heat shield 4, with enough travel to avoid their being any contact, in use, between these two components or possible deformations of the said lateral wall, as there used to be in the prior art.

Figure 6:
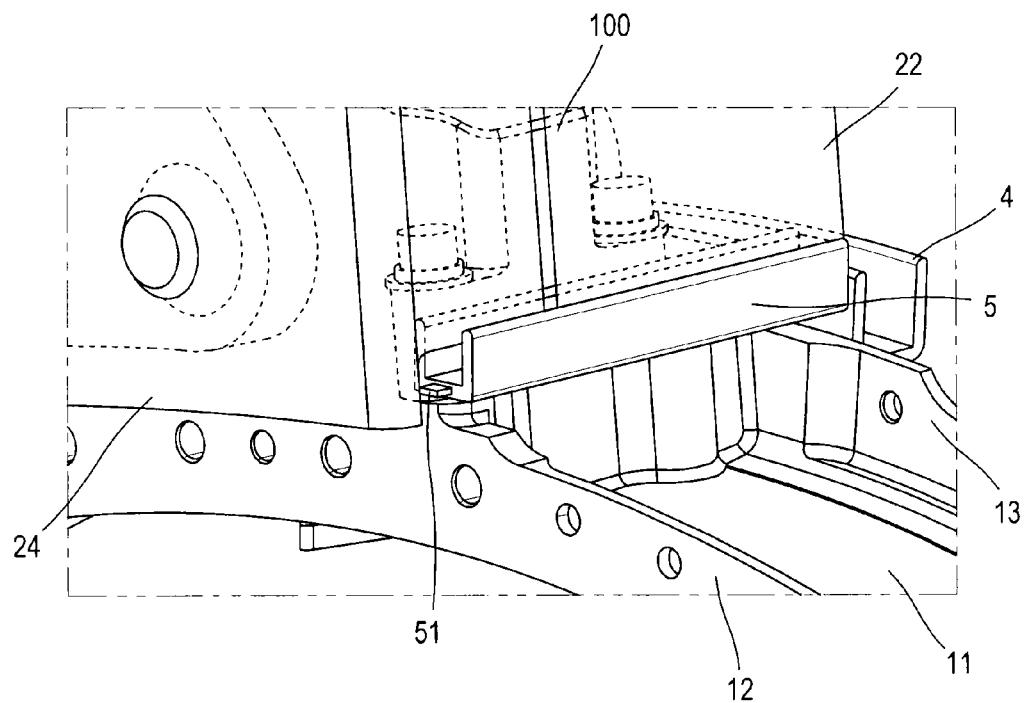
FIG. 6 is a perspective view of one of the constituent elements of the device of FIG. 4, when it is being mounted on the engine.

FIG. 6 shows a frontal heat shield 5 which is positioned at one of the circumferential ends of the heat shield 20 of the yoke 100. A similar second frontal heat shield, not depicted, is positioned at the other end of the yoke and of its heat shield. This frontal shield is U-shaped and extends axially, parallel to the outer shell ring 11 of the intermediate casing, to meet the two lateral heat shields mounted on the upstream 13 and downstream 12 flanges of this same casing. The purpose of the U shape is to create a space into which the heat shield panel of the yoke which is situated at the circumferentially furthest end thereof can fit radially. Combination of this U-shaped frontal shield and of this panel forms a double labyrinth which is once again able to oppose the spread towards the yoke of any fire coming from the engine.

Figure 7:
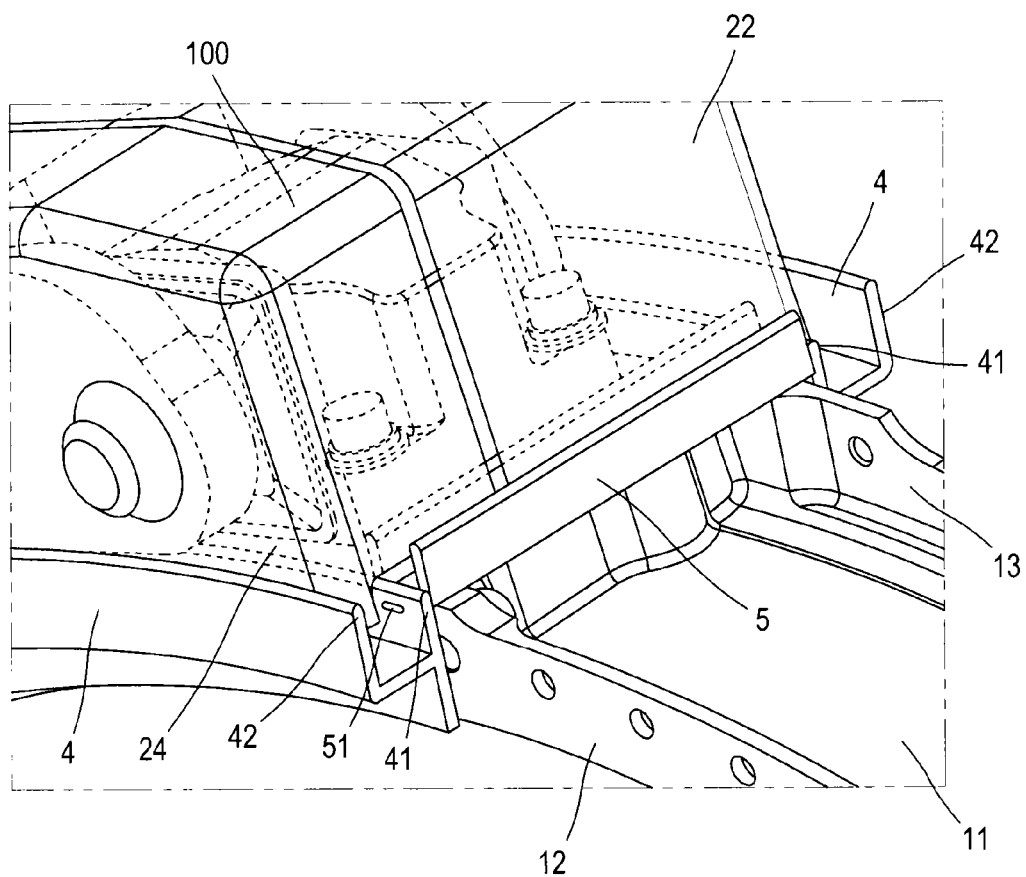
FIG. 7 is a perspective view of the complete device of FIG. 4, in position on the engine.

Finally, FIG. 7 shows the fitting of the lateral 4 and frontal 5 heat shields around the panels of the heat shield 20 of the yoke 100. Between the four of them, they form a groove to accommodate the radial panels of this heat shield, preventing, through their configuration as an at least double labyrinth, any fire there might be from progressing towards the yoke. They are associated with one another by a set of tenons and mortices, without this fixing means being prescriptive, the lower branches of the U of each frontal heat shield 5 comprising in their middle a tenon 51 extending in the axial direction and the inner branches 41 of the lateral heat shields 4 comprising a suitable mortice, made in its flank at each of its circumferential ends. Because of the positioning, on the one hand, of the tenon 51 on the branch that forms the bottom of the U of the frontal heat shield 5 and, on the other hand, of that of the mortice on the height of the inner branch 41, the bottoms of the two frontal 4 and lateral 5 heat shields are radially offset from one another; this offset is compensated for by different heights given to the panels of the heat shield 20 of the yoke which fit into the U-shaped or numeral-4-shaped shapes of the lateral and frontal shields. This offset does not hamper the continuity of the shield against the spread of fire, this protection still being afforded axially and circumferentially by the double labyrinths created. As a result, a panel introduced under the yoke 100 as in the prior art need no longer be there and omitting it allows the heat shield to be removed on line from the yoke, i.e. to be removed without having to remove the engine from the aircraft.

The process of installing a heat shield for an aircraft engine suspension yoke using a fire barrier device according to the invention will now be described.

The suspension yoke 100 is mounted in the conventional way on the shell ring 1 of the intermediate casing and the panels of its heat shield 20 are assembled and fixed to it. The operator offers up one of the lateral shields 4 and slides it circularly so as to slip the lower end of the lateral walls 24 into its central groove, i.e. between the inner 41 and outer 42 branches thereof. He positions this lateral shield circumferentially facing the heat shield 20 of the yoke and fixes it to the corresponding flange (chosen in the case of the figures to be the downstream flange of the fan casing and the upstream flange 13 of the intermediate casing) using fixing means which collaborate with the bores made in the flanges.

He then fits the two frontal heat shields 5 to the lateral heat shield 4 already installed by slipping them under the axial panels of the heat shield 20 of the yoke so that this heat shield enters the groove of the frontal heat shield 5 and making one of the tenons of each enter the corresponding mortice. He completes the operation by installing the second lateral heat shield 4 in the same way as before, i.e. by slipping it circularly to bring it to face the heat shield 20 of the yoke and by making the latter enter the groove created between the inner 41 and outer 42 branches. He takes care to ensure that the two tenons of the frontal shields 5 enter the mortices in this second lateral shield 4, something that is made possible by the freedom of movement that the inner branch 41 retains, and he fixes this second lateral shield using the fixing means which collaborate with the bores made in the flanges facing it (in this instance the upstream flange 31 of the outer fan duct and the downstream flange 12 of the intermediate casing).

The end result is radial and axial panels of the heat shield 20 of the suspension yoke 100 which are inserted into grooves made around its entire periphery by both the lateral and the frontal heat shields. This arrangement creates a double-labyrinth or even triple-labyrinth arrangement which is guaranteed to form a sufficient barrier against the spread to the yoke of any fire that might break out in the engine.

There is no need to fit a heat shield panel under the yoke, to guard against any lack of effectiveness at preventing the axial spread of fire through the assembly formed by the lateral wall 24 and the flanges of the outer fan duct and of the intermediate casing which, together, in the prior art formed only a single labyrinth barrier. The invention thus makes it possible to maintain effective protection against the spread of fire to the suspension yoke while at the same time allowing the heat shield to be fitted or removed without the need to remove the engine from the aircraft.

The fire barrier device has been described with reference to a yoke that suspends the engine from the intermediate casing. Quite clearly, the invention can also be implemented for a device that fixes the engine to the exhaust casing, whether this device be of the yoke type or of the localized individual support type.

The invention claimed is:

1. A heat shield device for a yoke suspending an engine from an aircraft, the device comprising:
   a panel fixed to and surrounding the yoke, the panel extending radially inward towards an axis of the engine, the panel having first and second lateral faces; and
   a component which is fixed to the engine and extending at least in part radially inward towards the axis of the engine, the component comprising a groove shaped in such a way that a lower end of the panel can be inserted into the groove,
   wherein the component includes an inner branch, an outer branch, and an axial branch therebetween, the groove being delimited by the inner branch, the outer branch, and the axial branch, and
   wherein the lower end of the panel and the groove are configured in such a manner to form a barrier against fire spread with at least a double chicane configuration for the heat shield.

2. The device according to claim 1, wherein the inner and outer branches extend parallel to each other.

3. The device according to claim 1, wherein the groove has a width greater than that of a part of the panel so as to allow the panel to move laterally within the groove.

4. The device according to claim 1, wherein a space in between two ribs of the panel has a width greater than that of the branches of the component, so as to allow the panel to move laterally with respect to the component.

5. The device according to claim 1, shaped to surround the yoke by four parallel walls extending radially so as to adapt to a shape of a turbomachine casing, in which device the component is formed of two partially cylindrical elements equipped with an attachment device which attaches the partially cylindrical elements to a turbomachine casing flange and of two rectilinear elements equipped with fixing devices which fix the rectilinear elements to the partially cylindrical elements.

6. The device according to claim 5, wherein the fixing devices are of a tenon type fitting into mortices made in the partially cylindrical elements.

7. The device according to claim 5, wherein the partially cylindrical elements have a shape of a numeral 4.

8. The device according to claim 5, wherein the rectilinear elements have a shape of a U, lower ends of the panel of the device being inserted between branches of the U.

9. A turbomachine comprising:
   a yoke attaching the turbomachine to an aircraft, which is positioned on at least one of an intermediate casing or an exhaust casing of the turbomachine; and
   a heat shield device according to claim 1, for the yoke.

10. The device according to claim 1, wherein the lower end of the panel includes first and second radial ribs which radially extend the first and second lateral faces of the panel, respectively, and presents a space between the first and second radial ribs.

11. The device according to claim 10, wherein the first radial rib is inserted into the groove, and the inner branch occupies the space, and the outer branch is outside the space.

12. The device according to claim 1, wherein the inner branch bears and espouses the shape of a flange of a casing of the engine and the outer branch extends radially so as to form a lateral heat shield and barrier against fire.

13. The device according to claim 2, wherein the inner branch bears and espouses the shape of a flange of a casing of the engine and the outer branch extends radially so as to form a lateral heat shield and barrier against fire.

14. A module comprising:
   an engine casing,
   a yoke for suspending and fixing the engine casing from an aircraft,
   a heat shield device comprising:
      a panel fixed to and surrounding the yoke and extending radially inward towards an axis of the engine, the panel having first and second lateral faces; and
      a component which is fixed to the engine casing and comprising a groove shaped in such a way that a lower end of the panel can be inserted into the groove,
   wherein the component includes an inner branch, an outer branch, and an axial branch therebetween, the groove being delimited by the inner branch, the outer branch, and the axial branch,
   wherein the lower end of the panel includes first and second radial ribs which radially extend the first and second lateral faces of the panel, respectively, and presents a space between the first and second radial ribs,
   wherein one of the first and second radial rib is inserted into the groove and the other first and second radial rib is outside the groove.

* * * * *